United States Patent
Hsu et al.

(10) Patent No.: US 11,572,469 B2
(45) Date of Patent: Feb. 7, 2023

(54) RESIN COMPOSITION AND ARTICLE MADE THEREFROM

(71) Applicant: Elite Material Co., Ltd., Taoyuan (TW)

(72) Inventors: Ching-Hsien Hsu, Taoyuan (TW); Tse-Hung Liu, Taoyuan (TW); Tsan-Hung Tsai, Taoyuan (TW)

(73) Assignee: ELITE MATERIAL CO., LTD., Taoyuan (TW)

( * ) Notice: Subject to any disclaimer, the term of this patent is extended or adjusted under 35 U.S.C. 154(b) by 139 days.

(21) Appl. No.: 17/339,566

(22) Filed: Jun. 4, 2021

(65) Prior Publication Data
US 2022/0372284 A1    Nov. 24, 2022

(30) Foreign Application Priority Data
May 11, 2021    (TW) .................................. 110116987

(51) Int. Cl.
*C08K 5/3492* (2006.01)
*C08L 71/12* (2006.01)

(52) U.S. Cl.
CPC ........ *C08L 71/123* (2013.01); *C08K 5/34924* (2013.01); *C08L 2205/025* (2013.01); *C08L 2205/035* (2013.01)

(58) Field of Classification Search
None
See application file for complete search history.

*Primary Examiner* — Richard A Huhn
(74) *Attorney, Agent, or Firm* — Muncy, Geissler, Olds & Lowe, P.C.

(57) ABSTRACT

A resin composition includes 100 parts by weight of a vinyl-containing polyphenylene ether resin; 2 parts by weight to 50 parts by weight of any compound having a structure of Formula (1) or a combination thereof; and 20 parts by weight to 80 parts by weight of a polyolefin resin; the polyolefin resin includes styrene-butadiene-divinylbenzene terpolymer, styrene-butadiene-maleic anhydride terpolymer, styrene-butadiene copolymer, hydrogenated styrene-butadiene copolymer, polybutadiene, maleic anhydride-butadiene copolymer or a combination thereof. Moreover, an article may be made from the resin composition, including a prepreg, a resin film, a laminate or a printed circuit board.

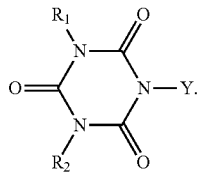

Formula (1)

10 Claims, No Drawings

RESIN COMPOSITION AND ARTICLE MADE THEREFROM

CROSS-REFERENCE TO RELATED APPLICATION

This application claims the priority benefits of Taiwan Patent Application No. 110116987, filed on May 11, 2021. The entirety the above-mentioned patent application is hereby incorporated by reference herein and made a part of this specification.

BACKGROUND

1. Field of the Disclosure

The present disclosure relates to a resin composition and an article made therefrom, more particularly to a resin composition useful for preparing a prepreg, a resin film, a laminate or a printed circuit board.

2. Description of Related Art

With the rapid advancement of the fifth generation mobile communication technology (5G), resin materials suitable for data transmission at high frequency and high speed have become the mainstream of laminate development, which requires low dissipation factor of laminate materials even at high temperature variation and high humidity variation, so as to make laminates operable normally in a high temperature and high humidity environment. However, most conventional low dielectric materials fail to achieve a high copper foil peeling strength, and the prevention of anodic leakage is an important factor in material development. Therefore, there is a need for developing materials suitable for a high performance laminate.

SUMMARY

To overcome the problems of prior arts, particularly one or more above-mentioned property demands facing conventional resin materials, it is a primary object of the present disclosure to provide a resin composition so as to achieve one or more desirable properties including a low difference of glass transition temperature (delta Tg, ΔTg), a low difference rate of dissipation factor, a high comparative tracking index and a high copper foil peeling strength.

To achieve the above-mentioned objects, the present disclosure provides a resin composition, comprising:
- (A) 100 parts by weight of a vinyl-containing polyphenylene ether resin;
- (B) 2 parts by weight to 50 parts by weight of any compound having a structure of Formula (1) or a combination thereof; and

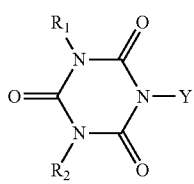

Formula (1)

- (C) 20 parts by weight to 80 parts by weight of a polyolefin resin, which comprises styrene-butadiene-divinylbenzene terpolymer, styrene-butadiene-maleic anhydride terpolymer, styrene-butadiene copolymer, hydrogenated styrene-butadiene copolymer, polybutadiene, maleic anhydride-butadiene copolymer or a combination thereof;

wherein, in Formula (1),
Y is

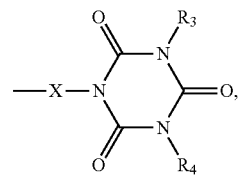

and X comprises X1, X2, X3, X4 or X5, wherein X1 to X5 are shown below:

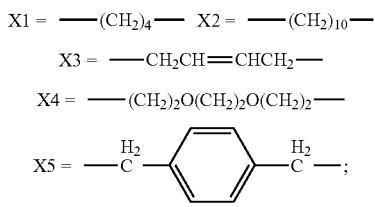

$R_1$ to $R_4$ are each an allyl group.

For example, in one embodiment, the vinyl-containing polyphenylene ether resin comprises a vinylbenzyl-containing biphenyl polyphenylene ether resin, a methacrylate-containing polyphenylene ether resin, a vinylbenzyl-containing bisphenol A polyphenylene ether resin, a chain-extended vinyl-containing polyphenylene ether resin or a combination thereof.

For example, in one embodiment, the resin composition described above is preferably characterized by not comprising an ethylene-propylene-diene terpolymer. For example, the ethylene-propylene-diene terpolymer is selected from the group consisting of ethylene-propylene-dicyclopentadiene terpolymer and ethylene-propylene-(5-ethylidene-2-norbornene) terpolymer.

For example, in one embodiment, the resin composition may optionally further comprise a maleimide resin, a bis(vinylphenyl) compound, an acrylate compound or a combination thereof. For example, in one embodiment, relative to 100 parts by weight of the vinyl-containing polyphenylene ether resin, the amount of any component described above may range from 1 part by weight to 50 parts by weight, preferably 5 parts by weight to 30 parts by weight, such as but not limited to 10 parts by weight to 20 parts by weight.

For example, in one embodiment, the resin composition may optionally further comprise flame retardant, inorganic filler, curing accelerator, polymerization inhibitor, solvent, silane coupling agent, coloring agent, toughening agent, core-shell rubber or a combination thereof. For example, in one embodiment, relative to 100 parts by weight of the vinyl-containing polyphenylene ether resin, the amount of the inorganic filler may be 10 parts by weight to 300 parts by weight. For example, in one embodiment, the amount of the solvent is not particularly limited and may be adjusted according to the viscosity required for the resin composition. For example, in one embodiment, in the resin composition disclosed herein, exclusive of inorganic filler and solvent, the amount of flame retardant, curing accelerator, polymerization inhibitor, silane coupling agent, coloring agent, toughening agent or core-shell rubber may be 0.01 part by weight to 300 parts by weight, such as but not limited to 0.01 part by weight to 3 parts by weight, 30 parts by weight to 80 parts by weight or 50 parts by weight to 300 parts by weight.

Another main object of the present disclosure is to provide an article made from the aforesaid resin composition, comprising a prepreg, a resin film, a laminate or a printed circuit board.

For example, in one embodiment, articles made from the resin composition disclosed herein have one, more or all of the following properties:
- a difference of glass transition temperature calculated according to a glass transition temperature as measured by reference to IPC-TM-650 2.4.24.4 of less than or equal to 10° C.;
- a difference rate of dissipation factor calculated according to a dissipation factor as measured by reference to HS C2565 at 10 GHz of less than or equal to 134%;
- a comparative tracking index as measured by reference to ASTM D3638 of greater than or equal to 500V; and
- a copper foil peeling strength as measured by reference to IPC-TM-650 2.4.8 of greater than or equal to 3.0 lb/in.

DESCRIPTION OF THE EMBODIMENTS

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

While some theories or mechanisms may be proposed herein, the present disclosure is not bound by any theories or mechanisms described regardless of whether they are right or wrong, as long as the embodiments can be implemented according to the present disclosure.

As used herein, "a," "an" or any similar expression is employed to describe components and features of the present disclosure. This is done merely for convenience and to give a general sense of the scope of the present disclosure. Accordingly, this description should be read to include one or at least one and the singular also includes the plural unless it is obvious to mean otherwise.

As used herein, "or a combination thereof" means "or any combination thereof", and "any" means "any one", vice versa.

As used herein, the term "comprises," "comprising," "includes," "including," "encompass," "encompassing," "has," "having" or any other variant thereof is construed as an open-ended transitional phrase intended to cover a non-exclusive inclusion. For example, a composition or article of manufacture that comprises a list of elements is not necessarily limited to only those elements but may include other elements not expressly listed but inherent to such composition or article of manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "encompass," "encompassing," "has," "having" or any other variant thereof, it is understood that close-ended transitional phrases such as "consisting of," "composed by" and "remainder being" and partially open-ended transitional phrases such as "consisting essentially of" "primarily consisting of," "mainly consisting of," "primarily containing," "composed essentially of," "essentially having," etc. are also disclosed and included.

In this disclosure, features and conditions such as values, numbers, contents, amounts or concentrations are presented as a numerical range or a percentage range merely for convenience and brevity. Therefore, a numerical range or a percentage range should be interpreted as encompassing and specifically disclosing all possible subranges and individual numerals or values therein, including integers and fractions, particularly all integers therein. For example, a range of "1.0 to 8.0" or "between 1.0 and 8.0" should be understood as explicitly disclosing all subranges such as 1.0 to 8.0, 1.0 to 7.0, 2.0 to 8.0, 2.0 to 6.0, 3.0 to 6.0, 4.0 to 8.0, 3.0 to 8.0 and so on and encompassing the endpoint values, particularly subranges defined by integers, as well as disclosing all individual values in the range such as 1.0, 2.0, 3.0, 4.0, 5.0, 6.0, 7.0 and 8.0. Unless otherwise defined, the aforesaid interpretation rule should be applied throughout the present disclosure regardless of broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$ and/or $X_3$. In addition, when a Markush group or a list of items is used to describe examples or embodiments of the present disclosure, a skilled artisan will understand that any subgroup or any combination of the members or items in the Markush group or list may also be used to describe the present disclosure. Therefore, for example, when X is described as being "selected from a group consisting of $X_1$, $X_2$ and $X_3$," and Y is described as being "selected from a group consisting of $Y_1$, $Y_2$ and $Y_3$," the disclosure includes any combination of X is $X_1$ and/or $X_2$ and/or $X_3$ and Y is $Y_1$ and/or $Y_2$ and/or $Y_3$.

Unless otherwise specified, according to the present disclosure, a compound refers to a chemical substance formed by two or more elements bonded with chemical bonds and may comprise a small molecule compound and a polymer compound, but not limited thereto. Any compound disclosed herein is interpreted to not only include a single chemical substance but also include a class of chemical substances having the same kind of components or having the same property.

Unless otherwise specified, according to the present disclosure, a polymer refers to the product formed by monomer(s) via polymerization and usually comprises multiple aggregates of polymers respectively formed by multiple repeated simple structure units by covalent bonds; the monomer refers to the compound forming the polymer. A polymer may comprise a homopolymer, a copolymer, a prepolymer, etc., but not limited thereto. A prepolymer refers to a chemical substance formed by two or more compounds via a polymerization reaction with a conversion rate of 10% to 90%. The term "polymer" includes but is not limited to an oligomer. An oligomer refers to a polymer with 2-20, typically 2-5, repeating units. For example, the term "diene polymer" as used herein is construed as comprising diene homopolymer, diene copolymer, diene prepolymer and diene oligomer.

Unless otherwise specified, according to the present disclosure, a copolymer refers to the product formed by two or more monomers via polymerization, including but not limited to random copolymers, alternating copolymers, graft copolymers or block copolymers. For example, a styrene-butadiene copolymer refers to the product formed only by styrene and butadiene monomers; a styrene-butadiene copolymer comprises, such as but not limited to, a styrene-butadiene random copolymer, a styrene-butadiene alternating copolymer, a styrene-butadiene graft copolymer or a styrene-butadiene block copolymer. A styrene-butadiene block copolymer comprises, such as but not limited to, a polymerized molecular structure of styrene-styrene-styrene-butadiene-butadiene-butadiene. A styrene-butadiene block copolymer comprises, such as but not limited to, a styrene-butadiene-styrene block copolymer. A styrene-butadiene-styrene block copolymer comprises, such as but not limited to, a polymerized molecular structure of styrene-styrene-styrene-butadiene-butadiene-butadiene-butadiene-styrene-styrene-styrene. Similarly, a hydrogenated styrene-butadiene copolymer comprises a hydrogenated styrene-butadiene random copolymer, a hydrogenated styrene-butadiene alternating copolymer, a hydrogenated styrene-butadiene graft copolymer or a hydrogenated styrene-butadiene block copolymer. A hydrogenated styrene-butadiene block copolymer comprises, such as but not limited to, a hydrogenated styrene-butadiene-styrene block copolymer.

Unless otherwise specified, the term "resin" is a widely used common name of a synthetic polymer and is construed in the present disclosure as comprising monomer and its combination, polymer and its combination or a combination of monomer and its polymer, but not limited thereto. For example, in the present disclosure, the term "maleimide resin" is construed to encompass a maleimide monomer, a maleimide polymer, a combination of maleimide monomers, a combination of maleimide polymers, or a combination of maleimide monomer(s) and maleimide polymer(s).

For example, in the present disclosure, the term "vinyl-containing" is construed to encompass the inclusion of a vinyl group, a vinylene group, an allyl group, a (meth) acrylate group or a combination thereof.

Unless otherwise specified, according to the present disclosure, a modification comprises a product derived from a resin with its reactive functional group modified, a product derived from a prepolymerization reaction of a resin and other resins, a product derived from a crosslinking reaction of a resin and other resins, a product derived from homopolymerizing a resin, a product derived from copolymerizing a resin and other resins, etc. For example, such as but not limited thereto, a modification may refer to replacing a hydroxyl group with a vinyl group via a chemical reaction, or obtaining a terminal hydroxyl group from a chemical reaction of a terminal vinyl group and p-aminophenol.

The unsaturated bond described herein, unless otherwise specified, refers to a reactive unsaturated bond, such as but not limited to an unsaturated double bond with the potential of being crosslinked with other functional groups, such as an unsaturated carbon-carbon double bond with the potential of being crosslinked with other functional groups, but not limited thereto.

Unless otherwise specified, according to the present disclosure, when the term acrylate compound is expressed as (meth)acrylate, it is intended to comprise both situations of containing and not containing a methyl group; for example, cyclohexane dimethanol di(meth)acrylate is construed as including cyclohexane dimethanol diacrylate, cyclohexane dimethanol dimethacrylate or both.

Unless otherwise specified, an alkyl group described herein is construed to encompass various isomers thereof. For example, a propyl group is construed to encompass n-propyl and i-propyl.

It should be understood that all features disclosed herein may be combined in any way to constitute the solution of the present disclosure, as long as there is no conflict present in the combination of these features.

Unless otherwise specified, as used herein, part(s) by weight represents weight part(s) in any weight unit, such as but not limited to kilogram, gram, pound and so on. For example, 100 parts by weight of the maleimide resin may represent 100 kilograms of the maleimide resin or 100 pounds of the maleimide resin.

The following embodiments and examples are illustrative in nature and are not intended to limit the present disclosure and its application. In addition, the present disclosure is not bound by any theory described in the background and summary above or the following embodiments or examples. Unless otherwise specified, processes, reagents and conditions described in the examples are those known in the art.

Generally, the present disclosure provides a resin composition, comprising:

(A) 100 parts by weight of a vinyl-containing polyphenylene ether resin;
(B) 2 parts by weight to 50 parts by weight of any compound having a structure of Formula (1) or a combination thereof; and

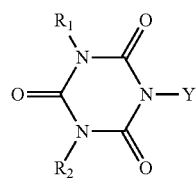

Formula (1)

(C) 20 parts by weight to 80 parts by weight of a polyolefin resin, which comprises styrene-butadiene-divinylbenzene terpolymer, styrene-butadiene-maleic anhydride terpolymer, styrene-butadiene copolymer, hydrogenated styrene-butadiene copolymer, polybutadiene, maleic anhydride-butadiene copolymer or a combination thereof;

wherein, in Formula (1),
Y is

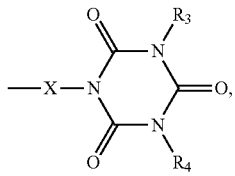

and X comprises X1, X2, X3, X4 or X5, wherein X1 to X5 are shown below:

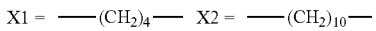
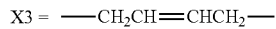
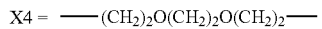
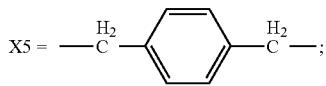

$R_1$ to $R_4$ are each an allyl group.

Unless otherwise specified, the vinyl-containing polyphenylene ether resin described in various embodiments may comprise various polyphenylene ether resins with terminals modified by a vinyl group, an allyl group, or a (meth)acrylate group, such as a vinylbenzyl-containing biphenyl polyphenylene ether resin, a methacrylate-containing polyphenylene ether resin, a vinylbenzyl-containing bisphenol A polyphenylene ether resin, a chain-extended vinyl-containing polyphenylene ether resin or a combination thereof, but not limited thereto.

For example, in one embodiment, the vinyl-containing polyphenylene ether resin may comprise various vinyl-containing polyphenylene ether resins known in the art to which this disclosure pertains. The vinyl-containing polyphenylene ether resin suitable for the present disclosure is not particularly limited and may comprise any one or more commercially available products, self-prepared products, or a combination thereof. In some embodiments, examples of the vinyl-containing polyphenylene ether resin include: vinylbenzyl-containing biphenyl polyphenylene ether resin (e.g., OPE-2st available from Mitsubishi Gas Chemical Co., Inc.), methacrylate-containing polyphenylene ether resin (e.g., SA9000 available from Sabic), vinylbenzyl-containing bisphenol A polyphenylene ether resin, chain-extended vinyl-containing polyphenylene ether resin or a combination thereof. The chain-extended vinyl-containing polyphenylene ether resin may include various polyphenylene ether resins disclosed in the US Patent Application Publication No. 2016/0185904 A1, all of which are incorporated herein by reference in their entirety.

For example, in one embodiment, the resin composition disclosed herein is preferably characterized by not comprising an ethylene-propylene-diene terpolymer. For example, the ethylene-propylene-diene terpolymer is selected from the group consisting of ethylene-propylene-dicyclopentadiene terpolymer and ethylene-propylene-(5-ethylidene-2-norbornene) terpolymer.

For example, in one embodiment, in the resin composition of the present disclosure, any compound having a structure of Formula (1) or a combination thereof may be used as the crosslinking agent of the resin composition. Unless otherwise specified, relative to 100 parts by weight of the vinyl-containing polyphenylene ether resin, any compound having a structure of Formula (1) or a combination thereof may range from 2 parts by weight to 50 parts by weight, such as but not limited to 2 parts by weight, 5 parts by weight, 10 parts by weight, 20 parts by weight, 30 parts by weight, 40 parts by weight or 50 parts by weight.

For example, in one embodiment, in the resin composition disclosed herein, relative to 100 parts by weight of the vinyl-containing polyphenylene ether resin, the polyolefin resin may range from 20 parts by weight to 80 parts by weight, such as but not limited to 20 parts by weight, 30 parts by weight, 40 parts by weight, 50 parts by weight, 60 parts by weight, 70 parts by weight or 80 parts by weight.

In addition to the aforesaid components, for example, in one embodiment, the resin composition may optionally further comprise a maleimide resin, a bis(vinylphenyl) compound, an acrylate compound or a combination thereof. For example, in one embodiment, in the resin composition disclosed herein, relative to 100 parts by weight of the vinyl-containing polyphenylene ether resin, the amount of any component described above may range from 1 part by weight to 50 parts by weight, preferably 5 parts by weight to 30 parts by weight, such as but not limited to 10 parts by weight to 20 parts by weight.

For example, in one embodiment, the maleimide resin of the present disclosure comprises a monomer containing at least one maleimide group, its polymer, or a combination thereof. Unless otherwise specified, the maleimide resin used in the present disclosure is not particularly limited and may include any one or more maleimide resins useful for preparing a prepreg, a resin film, a laminate or a printed circuit board. In some embodiments, any one or more of the maleimide resins below may be used: 4,4'-diphenylmethane bismaleimide, oligomer of phenylmethane maleimide (a.k.a. polyphenylmethane maleimide), bisphenol A diphenyl ether bismaleimide, 3,3'-dimethyl-5,5'-diethyl-4,4'-diphenylmethane bismaleimide (a.k.a. bis-(3-ethyl-5-methyl-4-maleimidephenyl)methane), 3,3'-dimethyl-5,5'-dipropyl-4,4'-diphenylmethane bismaleimide, m-phenylene bismaleimide, 4-methyl-1,3-phenylene bismaleimide, 1,6-bismaleimide-(2,2,4-trimethyl)hexane, N-2,3-xylylmaleimide, N-2,6-xylylmaleimide, N-phenylmaleimide, vinyl benzyl maleimide (VBM), maleimide resin containing aliphatic long chain structure, prepolymer of diallyl compound and maleimide resin, prepolymer of diamine and maleimide resin, prepolymer of multi-functional amine and maleimide resin, prepolymer of acid phenol compound and maleimide resin, or a combination thereof. Unless otherwise specified, the maleimide resins described above should be construed as including the modifications thereof.

For example, the maleimide resin may include products such as BMI-1000, BMI-1000H, BMI-1100, BMI-1100H, BMI-2000, BMI-2300, BMI-3000, BMI-3000H, BMI-4000, BMI-5000, BMI-5100, BMI-TMH, BMI-7000 and BMI-7000H available from Daiwakasei Industry Co., Ltd., or products such as BMI-70 and BMI-80 available from K.I Chemical Industry Co., Ltd.

For example, the maleimide resin containing aliphatic long chain structure may include products such as BMI-689, BMI-1400, BMI-1500, BMI-1700, BMI-2500, BMI-3000, BMI-5000 and BMI-6000 available from Designer Molecules Inc.

For example, in one embodiment, the bis(vinylphenyl) compound disclosed herein comprises bis(vinylphenyl) ethane, bis(vinylphenyl) dimethylbenzene, bis(vinylphenyl) dimethyl ether, bis(vinylphenyl) diethylbenzene or a combination thereof.

For example, in one embodiment, the bis(vinylphenyl) ethane may include 1,2-bis(4-vinylphenyl) ethane, 1,2-(3-vinylphenyl-4-vinylphenyl) ethane, 1,2-bis(3-vinylphenyl) ethane or a combination thereof.

For example, in one embodiment, examples of the acrylate compound disclosed herein may comprise, but not limited to, various bifunctional acrylates, trifunctional acrylates and multi-functional acrylates containing two or more unsaturated bonds per molecule known in the art to which this disclosure pertains; examples include but are not limited to cyclohexane dimethanol di(meth)acrylate, ethylene glycol di(meth)acrylate, 1,4-butylene glycol di(meth)acrylate, ethoxylated bisphenol A di(meth)acrylate, tricyclodecane di(meth)acrylate, trimethylolpropane tri(meth)acrylate, [(octahydro-4,7-methano-1H-indene-5,6-diyl)bis(methylene)] di(meth)acrylate, tris(2-hydroxyethyl) isocyanurate tri(meth)acrylate, trimethylolpropane tri(meth)acrylate, ethoxylated trimethylolpropane tri(meth)acrylate, pentaerythritol tetra(meth)acrylate, 1,6-hexanediol diacrylate or a combination thereof.

For example, the acrylate compound may be available from Sartomer under the product names CD406, CD595, SR205 NS, SR206 NS, SR214, SR231 NS, SR238 NS, SR239 NS, SR252, SR259, SR262, SR268, SR297, SR297 F NS, SR306 NS, SR344, SR348 L NS, SR348 OP NS, SR349 NS, SR490 NS, SR508 NS, SR601 NS, SR602NS, SR603 OP, SR610 NS, SR644, SR833S, SR9003 NS, SR350 NS, SR351 NS, SR368 D NS, SR368 NS, SR415, SR444 NS, SR454NS, SR502 NS, SR517 NS, SR9020 NS, SR9035, SR9051 NS, SR9053, DPHA, SR295 NS, SR355 HV NS, SR355 NS, SR494 NS, and TFN series products.

For example, in one embodiment, in addition to the aforesaid components, the resin composition may optionally further comprise flame retardant, inorganic filler, curing accelerator, polymerization inhibitor, solvent, silane coupling agent, coloring agent, toughening agent, core-shell rubber or a combination thereof.

For example, in one embodiment, in the resin composition disclosed herein, exclusive of inorganic filler and solvent, the amount of flame retardant, curing accelerator, polymerization inhibitor, silane coupling agent, coloring agent, toughening agent or core-shell rubber may be 0.01 part by weight to 300 parts by weight, such as but not limited to 0.01 part by weight to 3 parts by weight, 30 parts by weight to 80 parts by weight or 50 parts by weight to 300 parts by weight.

Unless otherwise specified, the flame retardant suitable for the present disclosure may be any one or more flame retardants suitable for preparing a prepreg, a resin film, a laminate or a printed circuit board; examples include but are not limited to phosphorus-containing flame retardants, preferably including ammonium polyphosphate, hydroquinone bis(diphenyl phosphate), bisphenol A bis(diphenylphosphate), tri(2-carboxyethyl)phosphine (TCEP), phosphoric acid tris(chloroisopropyl) ester, trimethyl phosphate (TMP), dimethyl methyl phosphonate (DMMP), resorcinol bis(dixylenyl phosphate) (RDXP, such as commercially available PX-200, PX-201, and PX-202), phosphazene (such as commercially available SPB-100, SPH-100, and SPV-100), melamine polyphosphate, 9,10-dihydro-9-oxa-10-phosphaphenanthrene-10-oxide (DOPO) and its derivatives (such as a di-DOPO compound) or resins, diphenylphosphine oxide (DPPO) and its derivatives (such as a di-DPPO compound) or resins, melamine cyanurate, tri-hydroxyethyl isocyanurate, aluminium phosphinate (e.g., commercially available OP-930 and OP-935), or a combination thereof. Unless otherwise specified, the amount of the flame retardant is not particularly limited.

For example, the flame retardant may be a DPPO compound (e.g., di-DPPO compound), a DOPO compound (e.g., di-DOPO compound), a DOPO resin (e.g., DOPO-HQ, DOPO-NQ, DOPO-PN, and DOPO-BPN), and a DOPO-containing epoxy resin, wherein DOPO-PN is a DOPO-containing phenol novolac resin, and DOPO-BPN may be a DOPO-containing bisphenol novolac resin, such as DOPO-BPAN (DOPO-bisphenol A novolac), DOPO-BPFN (DOPO-bisphenol F novolac) and DOPO-BPSN (DOPO-bisphenol S novolac). Unless otherwise specified, the amount of the aforesaid flame retardant is not particularly limited.

For example, in one embodiment, the inorganic filler suitable for the present disclosure may be any one or more inorganic fillers suitable for preparing a prepreg, a resin film, a laminate or a printed circuit board, examples including but not limited to silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, barium titanate, lead titanate, strontium titanate, calcium titanate, magnesium titanate, barium zirconate, lead zirconate, magnesium zirconate, lead zirconate titanate, zinc molybdate, calcium molybdate, magnesium molybdate, ammonium molybdate, zinc molybdate-modified talc, zinc oxide, zirconium oxide, mica, boehmite (AlOOH), calcined talc, talc, silicon nitride, or calcined kaolin. Moreover, the inorganic filler can be spherical, fibrous, plate-like, particulate, sheet-like or whisker-like in shape and can be optionally pretreated by a silane coupling agent.

Unless otherwise specified, relative to 100 parts by weight of the vinyl-containing polyphenylene ether resin, in the resin composition disclosed herein, the amount of the inorganic filler described above is not particularly limited and may range from 10 parts by weight to 300 parts by weight, for example. Preferably, the amount of the inorganic filler described above may range from 80 parts by weight to 270 parts by weight. More preferably, the amount of the inorganic filler described above may range from 240 parts by weight to 270 parts by weight.

Unless otherwise specified, the amount of the curing accelerator used herein may be adjusted according to the need. For example, relative to 100 parts by weight of the vinyl-containing polyphenylene ether resin, in the resin composition disclosed herein, the amount of curing accelerator described above is not particularly limited and may range from 0.1 part by weight to 15 parts by weight, such as 0.1 part by weight to 0.5 part by weight or 1 part by weight to 10 parts by weight.

The polymerization inhibitor suitable for the present disclosure may inhibit the polymerization reaction. Unless otherwise specified, examples thereof are not particularly limited, which may include various molecule type polymerization inhibitors, stable free radical type polymerization inhibitors or a combination thereof known in the field to which this disclosure pertains. For example, molecule type polymerization inhibitors suitable for the present disclosure include but are not limited to phenols, quinones, arylamines, arene nitro compounds, sulfur-containing compounds, chlorides of metal with variable valency or a combination thereof. More specifically, molecule type polymerization inhibitors suitable for the present disclosure include but are not limited to phenol, hydroquinone, 4-tert-butylcatechol, benzoquinone, chloroquinone, 1,4-naphthoquinone, trimethylquinone, aniline, nitrobenzene, $Na_2S$, $FeCl_3$, $CuCl_2$ or a combination thereof. For example, stable free radical type polymerization inhibitors suitable for the present disclosure include but are not limited to 1,1-diphenyl-2-picrylhydrazyl radical (DPPH), triphenylmethyl radical or a combination thereof.

The purpose of adding solvent according to the present disclosure is to dissolve the components in the resin composition so as to change the solid content of the resin composition and to adjust the viscosity of the resin composition. For example, the solvent may comprise, but not limited to, methanol, ethanol, ethylene glycol monomethyl ether, acetone, butanone (i.e., methyl ethyl ketone), methyl isobutyl ketone, cyclohexanone, toluene, xylene, methoxyethyl acetate, ethoxyethyl acetate, propoxyethyl acetate, ethyl acetate, propylene glycol methyl ether, dimethyl formamide, dimethyl acetamide, N-methyl-pyrrolidone, or a mixture thereof. The amount of solvent is not particularly limited and may be adjusted according to the viscosity required for the resin composition.

Unless otherwise specified, silane coupling agent suitable for the present disclosure may comprise silane (such as but not limited to siloxane), which may be further categorized according to the functional groups into amino silane, epoxide silane, vinyl silane, ester silane, hydroxyl silane, isocyanate silane, methacryloxy silane and acryloxy silane. The amount of silane coupling agent is not particularly limited and may be adjusted according to the dispersivity of inorganic filler used in the resin composition.

Unless otherwise specified, the coloring agent suitable for the present disclosure may comprise, but not limited to, dye or pigment.

The purpose of toughening agent used herein is to improve the toughness of the resin composition. Unless otherwise specified, the toughening agent suitable for the present disclosure may comprise, but not limited to, carboxyl-terminated butadiene acrylonitrile rubber (CTBN rubber).

The resin compositions of various embodiments of the present disclosure may be processed by various methods into different articles, including but not limited to a prepreg, a resin film, a laminate or a printed circuit board.

For example, the resin compositions of various embodiments may be used to make prepregs.

For example, in one embodiment, the prepreg disclosed herein has a reinforcement material and a layered structure formed thereon, wherein the layered structure is made by heating the resin composition at high temperature to a semi-cured state (B-stage). Suitable baking temperature for making the prepreg may be for example 140° C. to 180° C. The reinforcement material may be a fiber material or a non-fiber material, configured as any one of woven fabric and non-woven fabric, and the woven fabric preferably comprises fiberglass fabrics. Types of fiberglass fabrics are not particularly limited and may be any commercial fiberglass fabric useful for various printed circuit boards, such as E-glass fiber fabric, D-glass fiber fabric, S-glass fiber fabric, T-glass fiber fabric, L-glass fiber fabric or Q-glass fiber fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal polymer woven fabric, such as polyester woven fabric, polyurethane woven fabric and so on, but not limited thereto. The reinforcement material may increase the mechanical strength of the prepreg. In one preferred embodiment, the reinforcement material can be optionally pre-treated by a silane coupling agent. The prepreg may be further heated and cured to the C-stage to form an insulation layer.

For example, in one embodiment, by well mixing the resin composition to form a varnish, loading the varnish into an impregnation tank, impregnating a fiberglass fabric into the impregnation tank to adhere the resin composition onto the fiberglass fabric, and finally heating and baking the resin composition at a proper temperature to a semi-cured state, a prepreg may be obtained.

For example, the article made from the resin composition disclosed herein may be a resin film.

For example, in one embodiment, the resin film disclosed herein is prepared by heating and baking the resin composition to the semi-cured state. For example, by selectively coating the resin composition on a liquid crystal polymer film, a polyethylene terephthalate film (PET film) or a polyimide film, followed by heating and baking at a proper temperature to a semi-cured state, a resin film may be obtained. For example, the resin composition from each embodiment may be coated on a copper foil to uniformly adhere the resin composition thereon, followed by heating and baking at a proper temperature to a semi-cured state to obtain the resin film.

For example, the resin compositions of various embodiments may be used to make laminates.

For example, in one embodiment, the laminate of the present disclosure comprises at least two metal foils and at least one insulation layer disposed between the metal foils, wherein the insulation layer may be made by curing the resin composition at high temperature and high pressure to the C-stage, a suitable curing temperature being for example between 210° C. and 255° C. and preferably between 230° C. and 255° C., a suitable curing time being 90 to 240 minutes and preferably 120 to 210 minutes, and a suitable pressure being for example between 400 and 800 psi and preferably between 500 and 650 psi. The insulation layer may be obtained by curing the aforesaid prepreg or resin film. The metal foil may contain copper, aluminum, nickel, platinum, silver, gold or alloy thereof, such as a copper foil. In a preferred embodiment, the laminate is a copper-clad laminate.

For example, in one embodiment, the laminate may be further processed by trace formation processes to provide a printed circuit board.

In one embodiment of making a printed circuit board, a double-sided copper-clad laminate (such as product EM-891, available from Elite Material Co., Ltd.) with a thickness of 28 mil and having 0.5 ounce (oz) HVLP (hyper very low profile) copper foils may be used, which is subject to drilling and then electroplating, so as to form electrical conduction between the top layer copper foil and the bottom layer copper foil. Then the top layer copper foil and the bottom layer copper foil are etched to form inner layer circuits. Then brown oxidation and roughening are performed on the inner layer circuits to form uneven structures on the surface to increase roughness. Next, a vacuum lamination apparatus is used to laminate the assembly of a copper foil, the prepreg, the inner layer circuit, the prepreg and a copper foil stacked in said order by heating at 190° C. to 245° C. for 90 to 240 minutes to cure the insulation material of the prepregs. Next, black oxidation, drilling, copper plating and other known circuit board processes are performed on the outmost copper foils so as to obtain the printed circuit board.

In one embodiment, the resin composition disclosed herein may achieve improvement in one or more of the following properties of the article made therefrom: difference of glass transition temperature, difference rate of dissipation factor, comparative tracking index and copper foil peeling strength.

For example, articles made from the resin compositions according to the present disclosure may achieve one, more or all of the following properties:

a difference of glass transition temperature calculated according to a glass transition temperature as measured by reference to IPC-TM-650 2.4.24.4 of less than or equal to 10° C., such as between 10° C. and 0° C., such as less than or equal to 10° C., less than or equal to 9° C., less than or equal to 8° C., less than or equal to 4° C., less than or equal to 3° C. or less than or equal to 1° C., such as a difference of glass transition temperature of about 0° C.;

a difference rate of dissipation factor calculated according to a dissipation factor as measured by reference to JIS C2565 at 10 GHz of less than or equal to 134%, such as between 100% and 134%, such as less than or equal to 133%, less than or equal to 130%, less than or equal to 125%, less than or equal to 120%, less than or equal to 115%, less than or equal to 110%, less than or equal to 105% or less than or equal to 100%, such as between 100% and 133%;

a comparative tracking index as measured by reference to ASTM D3638 of greater than or equal to 500V, such as between 500V and 600V, such as greater than or equal to 525V, greater than or equal to 550V, greater than or equal to 575V or equal to 600V; and a copper foil peeling strength as measured by reference to IPC-TM-650 2.4.8 of greater than or equal to 3.0 lb/in, such as between 3.0 lb/in and 4.1 lb/in, such as greater than or equal to 3.0 lb/in, greater than or equal to 3.5 lb/in, greater than or equal to 3.6 lb/in, greater than or equal to 3.7 lb/in, greater than or equal to 3.8 lb/in, greater than or equal to 3.9 lb/in or greater than or equal to 4.1 lb/in.

Raw materials below were used to prepare the resin compositions of various Examples and Comparative Examples of the present disclosure according to the amount listed in Table 1 to Table 5 and further fabricated to prepare test samples.

Materials and reagents used in Examples and Comparative Examples disclosed herein are listed below:

SA9000: methacrylate-containing polyphenylene ether resin, available from Sabic.

OPE-2st-1: OPE-2st 1200, vinylbenzyl-containing biphenyl polyphenylene ether resin, available from Mitsubishi Gas Chemical Co., Inc.

OPE-2st-2: OPE-2st 2200, vinylbenzyl-containing biphenyl polyphenylene ether resin, available from Mitsubishi Gas Chemical Co., Inc.

Compound of Formula (1)-X1: having a structure of Formula (1), wherein X is X1, prepared by Preparation Example 1.

Compound of Formula (1)-X2: having a structure of Formula (1), wherein X is X2, prepared by Preparation Example 2.

Compound of Formula (1)-X3: having a structure of Formula (1), wherein X is X3, prepared by Preparation Example 3.

Compound of Formula (1)-X4: having a structure of Formula (1), wherein X is X4, prepared by Preparation Example 4.

Compound of Formula (1)-X5: having a structure of Formula (1), wherein X is X5, prepared by Preparation Example 5.

Compound of Formula (2): wherein Q is a $C_6$ to $C_{16}$ alkyl group, prepared by Preparation Example 6.

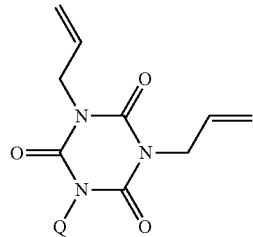

Formula (2)

TAIC: triallyl isocyanurate, commercially available.

Ricon 184MA6: styrene-butadiene-maleic anhydride terpolymer, available from Cray Valley.

Ricon 100: styrene-butadiene copolymer, available from Cray Valley.

Ricon 257: styrene-butadiene-divinylbenzene terpolymer, available from Cray Valley.

B-3000: polybutadiene, available from Nippon Soda Co., Ltd.

Ricon 130MA13: maleic anhydride-butadiene copolymer, available from Cray Valley.

Ricon 131MA5: maleic anhydride-butadiene copolymer, available from Cray Valley.

D1118: styrene-butadiene-styrene block copolymer, available from Kraton Polymers.

ASAPRENE T438: styrene-butadiene-styrene block copolymer, available from Asahi KASEI.

G1726: hydrogenated styrene-butadiene-styrene block copolymer, available from Kraton Polymers.

H1043: hydrogenated styrene-butadiene-styrene block copolymer, available from Asahi KASEI.

P1500: hydrogenated styrene-butadiene-styrene block copolymer, available from Asahi KASEI.

Trilene 65: ethylene-propylene-dicyclopentadiene terpolymer, available from Lion Elastomers.

BA-230S: bisphenol A type cyanate ester, available from Lonza.

NC-7000L: naphthalene-containing epoxy resin, available from Nippon Kayaku.

BMI-3000: maleimide resin containing aliphatic long-chain structure, available from Designer Molecules Inc.

BVPE: bis(vinylphenyl) ethane, available from Linchuan Chemical Co., Ltd.

SR238 NS: 1,6-hexanediol diacrylate, available from Sartomer.

25B: 2,5-dimethyl-2,5-di(tert-butylperoxy)-3-hexyne, available from NOF Corporation.

DMDPB: 2,3-dimethyl-2,3-diphenylbutane, available from Wuxi Zhufeng Fine Chemical Co., Ltd.

2Pz: 2-phenyl-1H-imidazole, available from Kingyorker Enterprise Co., Ltd.

Co(III): cobalt acetylacetonate (III), available from Kingyorker Enterprise Co., Ltd.

SC2050 SMJ: spherical silica, available from Admatechs. In the Tables, "Z" represents the total amount of components excluding (i.e., not containing) inorganic filler and solvent in the resin composition of each Example or each Comparative Example. In the Tables, "Z*1.4" represents the amount of inorganic filler is 1.4 times of "Z". For example, in Example E1, "Z*1.4" represents that the amount of inorganic filler is 267.4 parts by weight (191 parts by weight multiplied by 1.4).

Solvent mixture: mixture of methyl ethyl ketone (MEK) and toluene in a ratio of 2:8, prepared by Applicant. In the Tables, "Z" represents the total amount of components excluding (i.e., not containing) solvent and inorganic filler in the resin composition of each Example or each Comparative Example. In the Tables, "Z*1.3" represents that the amount of solvent is 1.3 times of "Z". For example, in Example E1, "Z*1.3" represents that the amount of solvent mixture is 248.3 parts by weight (191 parts by weight multiplied by 1.3).

Preparation Example 1

400 mL of N,N-dimethyl formamide (DMF) and 60 g (0.286 mole) of non-modified diallyl isocyanurate were added to a reactor, followed by stirring to dissolve the non-modified diallyl isocyanurate in the N,N-dimethyl formamide; next, 39.5 g (0.286 mole) of potassium carbonate and 30.9 g (0.143 mole) of 1,4-dibromobutane were added, the temperature was increased to 120° C. and stirring was continued at the constant temperature for 6 hours, and then the reaction was cooled to room temperature.

The solution was filtered, and DMF was removed from the filtrate. The residue was then dissolved in 400 mL of ethyl acetate and extracted with 200 mL of deionized water, 200 mL of 5 vol % hydrochloric acid and 200 mL of saturated sodium chloride solution in said order. The organic solution thus obtained was dried with magnesium sulfate and filtered, followed by removing the solvent to obtain the compound of Formula (1)-X1.

Preparation Example 2

400 mL of N,N-dimethyl formamide (DMF) and 60 g (0.286 mole) of non-modified diallyl isocyanurate were added to a reactor, followed by stirring to dissolve the non-modified diallyl isocyanurate in the N,N-dimethyl formamide; next, 39.5 g (0.286 mole) of potassium carbonate and 42.9 g (0.143 mole) of 1,10-dibromodecane were added, the temperature was increased to 120° C. and stirring was continued at the constant temperature for 6 hours, and then the reaction was cooled to room temperature.

The solution was filtered, and DMF was removed from the filtrate. The residue was then dissolved in 400 mL of ethyl acetate and extracted with 200 mL of deionized water, 200 mL of 5 vol % hydrochloric acid and 200 mL of saturated sodium chloride solution in said order. The organic solution thus obtained was dried with magnesium sulfate and filtered, followed by removing the solvent to obtain the compound of Formula (1)-X2.

Preparation Example 3

400 mL of N,N-dimethyl formamide (DMF) and 60 g (0.286 mole) of non-modified diallyl isocyanurate were added to a reactor, followed by stirring to dissolve the non-modified diallyl isocyanurate in the N,N-dimethyl formamide; next, 39.5 g (0.286 mole) of potassium carbonate and 30.6 g (0.143 mole) of 1,4-dibromobutene were added, the temperature was increased to 120° C. and stirring was continued at the constant temperature for 6 hours, and then the reaction was cooled to room temperature.

The solution was filtered, and DMF was removed from the filtrate. The residue was then dissolved in 400 mL of ethyl acetate and extracted with 200 mL of deionized water, 200 mL of 5 vol % hydrochloric acid and 200 mL of saturated sodium chloride solution in said order. The organic solution thus obtained was dried with magnesium sulfate and filtered, followed by removing the solvent to obtain the compound of Formula (1)-X3.

Preparation Example 4

400 mL of N,N-dimethyl formamide (DMF) and 60 g (0.286 mole) of non-modified diallyl isocyanurate were added to a reactor, followed by stirring to dissolve the non-modified diallyl isocyanurate in the N,N-dimethyl formamide; next, 39.5 g (0.286 mole) of potassium carbonate and 39.5 g (0.143 mole) of 1,2-bis(2-bromoethoxy)ethane were added, the temperature was increased to 120° C. and stirring was continued at the constant temperature for 6 hours, and then the reaction was cooled to room temperature.

The solution was filtered, and DMF was removed from the filtrate. The residue was then dissolved in 400 mL of ethyl acetate and extracted with 200 mL of deionized water, 200 mL of 5 vol % hydrochloric acid and 200 mL of saturated sodium chloride solution in said order. The organic solution thus obtained was dried with magnesium sulfate and filtered, followed by removing the solvent to obtain the compound of Formula (1)-X4.

Preparation Example 5

400 mL of N,N-dimethyl formamide (DMF) and 60 g (0.286 mole) of non-modified diallyl isocyanurate were added to a reactor, followed by stirring to dissolve the non-modified diallyl isocyanurate in the N,N-dimethyl formamide; next, 39.5 g (0.286 mole) of potassium carbonate and 37.8 g (0.143 mole) of 1,4-bis(bromomethyl)benzene were added, the temperature was increased to 120° C. and stirring was continued at the constant temperature for 6 hours, and then the reaction was cooled to room temperature.

The solution was filtered, and DMF was removed from the filtrate. The residue was then dissolved in 600 mL of ethyl acetate and extracted with 300 mL of deionized water, 300 mL of 5 vol % hydrochloric acid and 300 mL of saturated sodium chloride solution in said order. The organic solution thus obtained was dried with magnesium sulfate and filtered, followed by removing the solvent to obtain the compound of Formula (1)-X5.

Preparation Example 6

200 mL of N,N-dimethyl formamide (DMF) and 30 g (0.143 mole) of non-modified diallyl isocyanurate were added to a reactor, followed by stirring to dissolve the non-modified diallyl isocyanurate in the N,N-dimethyl formamide; next, 19.8 g (0.143 mole) of potassium carbonate was added, and the solution was heated to 50° C. and added with 53.9 g (0.143 mole) of 1-bromododecane; then the temperature was increased to 120° C. and stirring was continued at the constant temperature for 4 hours; after that, the reaction was cooled to room temperature.

The solution was filtered, and DMF was removed from the filtrate. The residue was then dissolved in 250 mL of ethyl acetate and extracted with 100 mL of deionized water, 100 mL of 5 vol % hydrochloric acid and 100 mL of saturated sodium chloride solution in said order. The organic solution thus obtained was dried with magnesium sulfate and filtered, followed by removing the solvent to obtain the compound of Formula (2).

Compositions and test results of resin compositions of Examples and Comparative Examples are listed below (in part by weight):

TABLE 1

Resin compositions of Examples (in part by weight) and test results

| Component | Name | E1 | E2 | E3 | E4 | E5 | E6 |
|---|---|---|---|---|---|---|---|
| vinyl-containing polyphenylene ether resin | SA9000 | 100 | 100 | 100 | 100 | 100 | 100 |
|  | OPE-2st-1 |  |  |  |  |  |  |
|  | OPE-2st-2 |  |  |  |  |  |  |
| crosslinking agent | Formula (1)-X1 | 30 | 2 | 50 | 30 | 30 | 30 |
|  | Formula (1)-X2 |  |  |  |  |  |  |
|  | Formula (1)-X3 |  |  |  |  |  |  |
|  | Formula (1)-X4 |  |  |  |  |  |  |
|  | Formula (1)-X5 |  |  |  |  |  |  |
|  | Formula (2) |  |  |  |  |  |  |
|  | TAIC |  |  |  |  |  |  |
| polyolefin | Ricon 184MA6 |  |  |  |  |  | 30 |
|  | Ricon 100 |  |  |  |  |  |  |
|  | Ricon 257 |  |  |  |  |  |  |
|  | B-3000 |  |  |  |  |  |  |
|  | Ricon 130MA13 |  |  |  |  |  |  |
|  | Ricon 131MA5 |  |  |  |  |  |  |
|  | D1118 |  |  |  |  |  |  |
|  | ASAPRENE T438 |  |  |  |  |  |  |
|  | G1726 | 50 | 50 | 50 | 20 | 80 | 20 |
|  | H1043 |  |  |  |  |  |  |
|  | P1500 |  |  |  |  |  |  |
|  | Trilene 65 |  |  |  |  |  |  |
| cyanate ester | BA-230S |  |  |  |  |  |  |
| epoxy resin | NC-7000L |  |  |  |  |  |  |
| maleimide resin | BMI-3000 |  |  |  |  |  |  |
| bis(vinylphenyl) compound | BVPE |  |  |  |  |  |  |
| acrylate compound | SR238 NS |  |  |  |  |  |  |
| curing accelerator | 25B | 1 | 1 | 1 | 1 | 1 | 1 |
|  | DMDPB | 10 | 10 | 10 | 10 | 10 | 10 |
|  | 2Pz |  |  |  |  |  |  |
|  | Co(III) |  |  |  |  |  |  |
| inorganic filler | SC2050 SMJ | Z*1.4 | Z*1.4 | Z*1.4 | Z*1.4 | Z*1.4 | Z*1.4 |
| solvent mixture | MEK:toluene = 2:8 | Z*1.3 | Z*1.3 | Z*1.3 | Z*1.3 | Z*1.3 | Z*1.3 |
| Property | Unit |  |  |  |  |  |  |
| DMA Tg1 | ° C. | 205 | 202 | 204 | 211 | 202 | 215 |
| DMA Tg2 | ° C. | 209 | 211 | 214 | 215 | 210 | 219 |
| ΔTg | ° C. | 4 | 9 | 10 | 4 | 8 | 4 |
| Df1 | none | 0.0022 | 0.0021 | 0.0022 | 0.0023 | 0.0020 | 0.0023 |
| Df2 | none | 0.0048 | 0.0049 | 0.0050 | 0.0053 | 0.0046 | 0.0048 |
| difference rate of dissipation factor | % | 118.2% | 133.3% | 127.3% | 130.4% | 130.0% | 108.7% |
| CTI | V | 550 | 500 | 600 | 500 | 525 | 575 |
| Hoz P/S | lb/in | 3.6 | 3.7 | 3.5 | 3.8 | 3.0 | 3.5 |

TABLE 2

Resin compositions of Examples (in part by weight) and test results

| Component | Name | E7 | E8 | E9 | E10 | E11 | E12 |
|---|---|---|---|---|---|---|---|
| vinyl-containing polyphenylene ether resin | SA9000 | 100 | 100 | 100 | 100 | 100 |  |
|  | OPE-2st-1 |  |  |  |  |  | 50 |
|  | OPE-2st-2 |  |  |  |  |  | 50 |
| crosslinking agent | Formula (1)-X1 | 30 | 30 | 30 | 30 | 30 | 30 |
|  | Formula (1)-X2 |  |  |  |  |  |  |
|  | Formula (1)-X3 |  |  |  |  |  |  |
|  | Formula (1)-X4 |  |  |  |  |  |  |
|  | Formula (1)-X5 |  |  |  |  |  |  |
|  | Formula (2) |  |  |  |  |  |  |
|  | TAIC |  |  |  |  |  |  |
| polyolefin | Ricon 184MA6 |  |  |  |  |  |  |
|  | Ricon 100 | 30 |  |  |  |  |  |
|  | Ricon 257 |  | 30 |  |  |  |  |
|  | B-3000 |  |  | 30 |  |  |  |

TABLE 2-continued

Resin compositions of Examples (in part by weight) and test results

|  |  | E7 | E8 | E9 | E10 | E11 | E12 |
|---|---|---|---|---|---|---|---|
|  | Ricon 130MA13 |  |  |  |  |  |  |
|  | Ricon 131MA5 |  |  |  |  |  |  |
|  | D1118 |  |  |  | 30 |  |  |
|  | ASAPRENE T438 |  |  |  |  | 30 |  |
|  | G1726 | 20 | 20 | 20 | 20 | 20 | 50 |
|  | H1043 |  |  |  |  |  |  |
|  | P1500 |  |  |  |  |  |  |
|  | Trilene 65 |  |  |  |  |  |  |
| cyanate ester | BA-230S |  |  |  |  |  |  |
| epoxy resin | NC-7000L |  |  |  |  |  |  |
| maleimide resin | BMI-3000 |  |  |  |  |  |  |
| bis(vinylphenyl) compound | BVPE |  |  |  |  |  |  |
| acrylate compound | SR238 NS |  |  |  |  |  |  |
| curing accelerator | 25B | 1 | 1 | 1 | 1 | 1 | 1 |
|  | DMDPB | 10 | 10 | 10 | 10 | 10 | 10 |
|  | 2Pz |  |  |  |  |  |  |
|  | Co(III) |  |  |  |  |  |  |
| inorganic filler | SC2050 SMJ | Z*1.4 | Z*1.4 | Z*1.4 | Z*1.4 | Z*1.4 | Z*1.4 |
| solvent mixture | MEK: toluene = 2:8 | Z*1.3 | Z*1.3 | Z*1.3 | Z*1.3 | Z*1.3 | Z*1.3 |
| Property | Unit |  |  |  |  |  |  |
| DMA Tg1 | °C. | 210 | 211 | 205 | 200 | 205 | 216 |
| DMA Tg2 | °C. | 214 | 215 | 205 | 201 | 205 | 224 |
| ΔTg | °C. | 4 | 4 | 0 | 1 | 0 | 8 |
| Df1 | none | 0.0020 | 0.0020 | 0.0020 | 0.0023 | 0.0023 | 0.0022 |
| Df2 | none | 0.0046 | 0.0044 | 0.0045 | 0.0047 | 0.0046 | 0.0048 |
| difference rate of dissipation factor | % | 130.0% | 120.0% | 125.0% | 104.3% | 100.0% | 118.2% |
| CTI | V | 550 | 550 | 575 | 600 | 600 | 575 |
| Hoz P/S | lb/in | 3.8 | 3.6 | 3.6 | 3.9 | 4.1 | 3.5 |

TABLE 3

Resin compositions of Examples (in part by weight) and test results

|  |  | E13 | E14 | E15 | E16 | E17 | E18 | E19 |
|---|---|---|---|---|---|---|---|---|
| Component | Name |  |  |  |  |  |  |  |
| vinyl-containing polyphenylene ether resin | SA9000 | 50 | 100 | 100 | 100 | 100 | 100 | 100 |
|  | OPE-2st-1 | 25 |  |  |  |  |  |  |
|  | OPE-2st-2 | 25 |  |  |  |  |  |  |
| crosslinking agent | Formula (1)-X1 | 15 | 30 | 30 | 30 | 30 | 30 |  |
|  | Formula (1)-X2 |  |  |  |  |  |  | 30 |
|  | Formula (1)-X3 | 5 |  |  |  |  |  |  |
|  | Formula (1)-X4 | 5 |  |  |  |  |  |  |
|  | Formula (1)-X5 | 5 |  |  |  |  |  |  |
|  | Formula (2) |  |  |  |  |  |  |  |
|  | TAIC |  |  |  |  |  |  |  |
| polyolefin | Ricon 184MA6 | 5 |  |  |  |  |  |  |
|  | Ricon 100 | 5 |  |  |  |  |  |  |
|  | Ricon 257 | 5 |  |  |  |  |  |  |
|  | B-3000 | 5 |  |  |  |  |  |  |
|  | Ricon 130MA13 | 5 |  |  |  |  |  |  |
|  | Ricon 131MA5 | 5 |  |  |  |  |  |  |
|  | D1118 |  |  |  |  |  |  |  |
|  | ASAPRENE T438 | 10 |  |  |  |  |  |  |
|  | G1726 | 10 | 50 | 50 | 50 |  |  | 50 |
|  | H1043 |  |  |  |  | 50 |  |  |
|  | P1500 |  |  |  |  |  | 50 |  |
|  | Trilene 65 |  |  |  |  |  |  |  |
| cyanate ester | BA-230S |  |  |  |  |  |  |  |
| epoxy resin | NC-7000L |  |  |  |  |  |  |  |
| maleimide resin | BMI-3000 |  | 10 |  |  |  |  |  |
| bis(vinylphenyl) compound | BVPE |  |  | 10 |  |  |  |  |
| acrylate compound | SR238 NS |  |  |  | 10 |  |  |  |
| curing accelerator | 25B | 0.8 | 1 | 1 | 1 | 1 | 1 | 1 |
|  | DMDPB | 5 | 10 | 10 | 10 | 10 | 10 | 10 |
|  | 2Pz |  |  |  |  |  |  |  |
|  | Co(III) |  |  |  |  |  |  |  |

TABLE 3-continued

Resin compositions of Examples (in part by weight) and test results

|  |  | E13 | E14 | E15 | E16 | E17 | E18 | E19 |
|---|---|---|---|---|---|---|---|---|
| inorganic filler | SC2050 SMJ | Z*1.3 | Z*1.4 | Z*1.4 | Z*1.4 | Z*1.4 | Z*1.4 | Z*1.4 |
| solvent mixture | MEK:toluene = 2:8 | Z*1.25 | Z*1.3 | Z*1.3 | Z*1.3 | Z*1.3 | Z*1.3 | Z*1.3 |
| Property | Unit |  |  |  |  |  |  |  |
| DMA Tg1 | ° C. | 220 | 216 | 222 | 201 | 205 | 206 | 201 |
| DMA Tg2 | ° C. | 221 | 220 | 230 | 205 | 209 | 209 | 205 |
| ΔTg | ° C. | 1 | 4 | 8 | 4 | 4 | 3 | 4 |
| Df1 | none | 0.0022 | 0.0022 | 0.0020 | 0.0023 | 0.0022 | 0.0021 | 0.0021 |
| Df2 | none | 0.0044 | 0.0051 | 0.0045 | 0.0051 | 0.0050 | 0.0049 | 0.0047 |
| difference rate of dissipation factor | % | 100.0% | 131.8% | 125.0% | 121.7% | 127.3% | 133.3% | 123.8% |
| CTI | V | 600 | 600 | 575 | 575 | 550 | 550 | 550 |
| Hoz P/S | lb/in | 3.8 | 3.8 | 3.8 | 3.7 | 3.6 | 3.7 | 3.8 |

TABLE 4

Resin compositions of Comparative Examples (in part by weight) and test results

| Component | Name | C1 | C2 | C3 | C4 | C5 |
|---|---|---|---|---|---|---|
| vinyl-containing polyphenylene ether resin | SA9000 | 100 | 100 | 100 | 100 | 100 |
|  | OPE-2st-1 |  |  |  |  |  |
|  | OPE-2st-2 |  |  |  |  |  |
| crosslinking agent | Formula (1)-X1 | 0.5 | 70 |  |  | 30 |
|  | Formula (1)-X2 |  |  |  |  |  |
|  | Formula (1)-X3 |  |  |  |  |  |
|  | Formula (1)-X4 |  |  |  |  |  |
|  | Formula (1)-X5 |  |  |  |  |  |
|  | Formula (2) |  |  | 30 |  |  |
|  | TAIC |  |  |  | 30 |  |
| polyolefin | Ricon 184MA6 |  |  |  |  |  |
|  | Ricon 100 |  |  |  |  |  |
|  | Ricon 257 |  |  |  |  |  |
|  | B-3000 |  |  |  |  |  |
|  | Ricon 130MA13 |  |  |  |  |  |
|  | Ricon 131MA5 |  |  |  |  |  |
|  | D1118 |  |  |  |  |  |
|  | ASAPRENE T438 |  |  |  |  |  |
|  | G1726 | 50 | 50 | 50 | 50 |  |
|  | H1043 |  |  |  |  |  |
|  | P1500 |  |  |  |  |  |
|  | Trilene 65 |  |  |  |  | 50 |
| cyanate ester | BA-230S |  |  |  |  |  |
| epoxy resin | NC-7000L |  |  |  |  |  |
| maleimide resin | BMI-3000 |  |  |  |  |  |
| bis(vinylphenyl) compound | BVPE |  |  |  |  |  |
| acrylate compound | SR238 NS |  |  |  |  |  |
| curing accelerator | 25B | 1 | 1 | 1 | 1 | 1 |
|  | DMDPB | 10 | 10 | 10 | 10 | 10 |
|  | 2Pz |  |  |  |  |  |
|  | Co(III) |  |  |  |  |  |
| inorganic filler | SC2050 SMJ | Z*1.4 | Z*1.4 | Z*1.4 | Z*1.4 | Z*1.4 |
| solvent mixture | MEK:toluene = 2:8 | Z*1.3 | Z*1.3 | Z*1.3 | Z*1.3 | Z*1.3 |
| Property | Unit |  |  |  |  |  |
| DMA Tg1 | ° C. | 216 | 182 | 188 | 192 | 188 |
| DMA Tg2 | ° C. | 229 | 201 | 205 | 210 | 211 |
| ΔTg | ° C. | 13 | 19 | 17 | 18 | 23 |
| Df1 | none | 0.0021 | 0.0022 | 0.0020 | 0.0021 | 0.0022 |
| Df2 | none | 0.0054 | 0.0054 | 0.0053 | 0.0056 | 0.0063 |
| difference rate of dissipation factor | % | 157.1% | 145.5% | 165.0% | 166.7% | 186.4% |
| CTI | V | 500 | 600 | 525 | 500 | 400 |
| Hoz P/S | lb/in | 3.5 | 3.0 | 2.9 | 3.1 | 2.8 |

TABLE 5

Resin compositions of Comparative Examples (in part by weight) and test results

| Component | Name | C6 | C7 | C8 | C9 |
|---|---|---|---|---|---|
| vinyl-containing polyphenylene ether resin | SA9000 | | | 100 | 100 |
| | OPE-2st-1 | | | | |
| | OPE-2st-2 | | | | |
| crosslinking agent | Formula (1)-X1 | 30 | 30 | 30 | 30 |
| | Formula (1)-X2 | | | | |
| | Formula (1)-X3 | | | | |
| | Formula (1)-X4 | | | | |
| | Formula (1)-X5 | | | | |
| | Formula (2) | | | | |
| | TAIC | | | | |
| polyolefin | Ricon 184MA6 | | | | |
| | Ricon 100 | | | | |
| | Ricon 257 | | | | |
| | B-3000 | | | | |
| | Ricon 130MA13 | | | | |
| | Ricon 131MA5 | | | | |
| | D1118 | | | | |
| | ASAPRENE T438 | | | | |
| | G1726 | 50 | 50 | 10 | 100 |
| | H1043 | | | | |
| | P1500 | | | | |
| | Trilene 65 | | | | |
| cyanate ester | BA-230S | 100 | | | |
| epoxy resin | NC-7000L | | 100 | | |
| maleimide resin | BMI-3000 | | | | |
| bis(vinylphenyl) compound | BVPE | | | | |
| acrylate compound | SR238 NS | | | | |
| curing accelerator | 25B | 1 | 1 | 1 | 1 |
| | DMDPB | 10 | 10 | 10 | 10 |
| | 2Pz | | 0.5 | | |
| | Co(III) | 0.1 | | | |
| inorganic filler | SC2050 SMJ | Z*1.4 | Z*1.4 | Z*1.4 | Z*1.4 |
| solvent mixture | MEK:toluene = 2:8 | Z*1.3 | Z*1.3 | Z*1.3 | Z*1.3 |
| Property | Unit | | | | |
| DMA Tg1 | ° C. | 240 | 252 | 210 | 195 |
| DMA Tg2 | ° C. | 258 | 279 | 214 | 211 |
| ΔTg | ° C. | 18 | 27 | 4 | 16 |
| Df1 | none | 0.0058 | 0.0068 | 0.0024 | 0.0018 |
| Df2 | none | 0.0176 | 0.0188 | 0.0060 | 0.0047 |
| difference rate of dissipation factor | % | 203.4% | 176.5% | 150.0% | 161.1% |
| CTI | V | 250 | 250 | 475 | 500 |
| Hoz P/S | lb/in | 3.8 | 4.2 | 4.0 | 2.8 |

Samples (specimens) for the properties measured above were prepared as described below and tested and analyzed under specified conditions below.

1. Prepreg: Resin composition from each Example (listed in Table 1 to Table 3) or each Comparative Example (listed in Table 4 and Table 5) was respectively well-mixed to form a varnish, in which the dissolvable solid state chemical reagents were all dissolved. Then the varnish was loaded to an impregnation tank, and a fiberglass fabric (e.g., 1078 L-glass fiber fabric, available from Asahi) was impregnated into the impregnation tank to adhere the resin composition onto the fiberglass fabric, followed by heating at 130° C. to 170° C. to the semi-cured state (B-stage) to obtain a prepreg. Each prepreg made from the 1078 L-glass fiber fabric has a resin content of about 80%.

2. Copper-containing laminate 1 (a.k.a. copper-clad laminate 1, formed by lamination of two prepregs): Two 18 μm HVLP (hyper very low profile) copper foils and two prepregs obtained from 1078 L-glass fiber fabrics impregnated with each Example or each Comparative Example and having a resin content of about 80% were prepared and stacked in the order of one copper foil, two prepregs and one copper foil, followed by lamination under vacuum with a lamination pressure of 600 psi at 235° C. for 150 minutes, wherein the peak temperature of lamination is 245° C., to form the copper-containing laminate 1. Insulation layers were formed by laminating to cure the two sheets of prepreg between the two copper foils, and the resin content of the insulation layers is about 80%.

3. Copper-containing laminate 2 (a.k.a. copper-clad laminate 2, formed by lamination of six prepregs): Two 18 μm HVLP (hyper very low profile) copper foils and six prepregs obtained from 1078 L-glass fiber fabrics impregnated with each Example or each Comparative Example and having a resin content of about 80% were prepared and stacked in the order of one copper foil, six prepregs and one copper foil, followed by lamination under vacuum with a lamination pressure of 600 psi at 235° C. for 150 minutes, wherein the peak temperature of lamination is 245° C., to form the copper-containing laminate 2. Insulation layers were formed by laminating to cure the six sheets of prepreg between the two copper foils, and the resin content of the insulation layers is about 80%.

4. Copper-containing laminate 3 (a.k.a. copper-clad laminate 3, formed by lamination of eighteen prepregs): Two 18 μm HVLP (hyper very low profile) copper foils and eighteen prepregs obtained from 1078 L-glass fiber fabrics impregnated with each Example or each Comparative Example and having a resin content of about 80% were prepared and stacked in the order of one copper foil, eighteen prepregs and one copper foil, followed by lamination under vacuum with a lamination pressure of 600 psi at 235° C. for 150 minutes, wherein the peak temperature of lamination is 245° C., to form the copper-containing laminate 3. Insulation layers were formed by laminating to cure the eighteen sheets of prepreg between the two copper foils, and the resin content of the insulation layers is about 80%.

5. Copper-free laminate 1 (formed by lamination of two prepregs): Each copper-containing laminate 1 was etched to remove the two copper foils to obtain a copper-free laminate 1 made from laminating two prepregs and having a resin content of about 80%.

6. Copper-free laminate 2 (formed by lamination of six prepregs): Each copper-containing laminate 2 was etched to remove the two copper foils to obtain a copper-free laminate 2 made from laminating six prepregs and having a resin content of about 80%.

7. Copper-free laminate 3 (formed by lamination of eighteen prepregs): Each copper-containing laminate 3 was etched to remove the two copper foils to obtain a copper-free laminate 3 made from laminating eighteen prepregs and having a resin content of about 80%.

For each sample, test items and test methods are described below.

Difference of Glass Transition Temperature

A copper-free laminate 2 sample (obtained by laminating six prepregs) was subject to the glass transition temperature measurement. The glass transition temperature (in ° C.) of each sample was measured using a dynamic mechanical analysis (DMA) method by reference to IPC-TM-650 2.4.24.4 at a temperature range of 35° C. to 270° C. with a temperature increase rate of 2° C./minute, from which a first glass transition temperature was obtained and defined as Tg1. After the sample was cooled to room temperature (about 25° C.), following the process of measuring Tg1, the glass transition temperature was measured again, from which a second glass transition temperature was obtained and defined as Tg2. Generally, the margin of error of a DMA instrument measuring Tg1 and Tg2 is about ±1° C. The difference of glass transition temperature (ΔTg) is defined as the difference between the second glass transition temperature (Tg2) and the first glass transition temperature (Tg1). For example, ΔTg=Tg2−Tg1. Lower difference of glass transition temperature represents more complete curing of the laminate, and higher difference of glass transition temperature represents incomplete or insufficient curing of the laminate. Incomplete or insufficient curing of the laminate usually causes an increase of moisture (water) absorption rate and results in negative impacts including poor thermal resistance of the laminate, unstable dielectric properties (e.g., Dk or Df) at high frequency, and so on.

Difference Rate of Dissipation Factor

The aforesaid copper-free laminate 1 (obtained by laminating two prepregs, having a resin content of about 80%) was subjected to dissipation factor measurement. Each sample was measured by using a microwave dielectrometer (available from AET Corp.) by reference to JIS C2565 at room temperature (about 25° C.) and under a 10 GHz frequency, from which a first dissipation factor was obtained and defined as Df1. In addition, following the process of measuring the first dissipation factor, the sample after having been subject to a temperature of 188° C. for 168 hours was then measured again to obtain a second dissipation factor, which is defined as Df2. The difference rate of dissipation factor is defined as the ratio of increase of the second dissipation factor relative to the first dissipation factor. For example, the difference rate of dissipation factor is equal to [(Df2−Df1)/Df1]*100%. Lower difference rate of dissipation factor is more preferred.

Comparative Tracking Index (CTI)

The aforesaid copper-free laminate 3 sample (obtained by laminating eighteen prepregs) with a size of 100 mm*100 mm*3 mm was tested by reference to the processes described in ASTM D3638. During the test, a 100V voltage was applied to the sample on the tester, followed by addition of one drop of 0.1 wt % ammonium chloride aqueous solution every 30 seconds until tracking was formed, and the total number of drops added before tracking was recorded. If tracking was not formed after the addition of 50 drops, the voltage was increased from 25V to 125V to test and record the tolerable voltage value of the sample. A voltage increment of 25V was applied per increase, and the voltage test range was from 100V to 600V. The unit used in the comparative tracking index test is voltage (abbreviated as "V").

Copper Foil Peeling Strength (0.5 Ounce, Hoz Peeling Strength, Hoz P/S)

The aforesaid copper-containing laminate 2 (obtained by laminating six prepregs) was cut into a rectangular sample with a width of 24 mm and a length of greater than 60 mm, which was etched to remove surface copper foil to leave a rectangular copper foil with a width of 3.18 mm and a length of greater than 60 mm, and tested by using a tensile strength tester by reference to IPC-TM-650 2.4.8 at room temperature (about 25° C.) to measure the force (lb/in) required to separate the 0.5 ounce copper foil from the insulation layer of the laminate. In the technical field to which the present disclosure pertains, higher copper foil peeling strength is better. Under a 10 GHz frequency, for a copper-clad laminate with a Df value of less than 0.0040, a difference in copper foil peeling strength of greater than or equal to 0.1 lb/in represents a substantial difference in copper foil peeling strength of different laminates.

The following observations can be made according to the test results above.

Resin compositions containing 100 parts by weight of a vinyl-containing polyphenylene ether resin, 2 parts by weight to 50 parts by weight of any compound having a structure of Formula (1) or a combination thereof, and 20 parts by weight to 80 parts by weight of a polyolefin resin, as described in the present disclosure, such as Examples E1 to E19, can all achieve a difference of glass transition temperature of less than or equal to 10° C.

In contrast to Examples E1 to E19, if the amount of any compound having a structure of Formula (1) or a combination thereof is not within the range of 2 parts by weight to 50 parts by weight, such as Comparative Examples C1 and C2, and if an allyl-containing bifunctional isocyanurate or an allyl-containing trifunctional isocyanurate is used in place of any compound having a structure of Formula (1), such as Comparative Examples C3 and C4, a difference of glass transition temperature of less than or equal to 10° C. will not be achieved.

In contrast to Examples E1 to E19, Comparative Example C5 (using a polyolefin resin different from the polyolefin resin as defined by the present disclosure) and Comparative Examples C6 and C7 (not containing a vinyl-containing polyphenylene ether resin) all fail to achieve a difference of glass transition temperature of less than or equal to 10° C.

In addition, in contrast to Examples E1 to E19, if the amount of polyolefin resin in the resin composition is not within the range of 20 parts by weight to 80 parts by weight, such as Comparative Examples C8 and C9, at least one properties including difference rate of dissipation factor, comparative tracking index, copper foil peeling strength and difference of glass transition temperature will not be satisfactory.

In addition, resin compositions containing 100 parts by weight of a vinyl-containing polyphenylene ether resin, 2 parts by weight to 50 parts by weight of any compound having a structure of Formula (1) or a combination thereof, and 20 parts by weight to 80 parts by weight of a polyolefin resin, as described in the present disclosure, such as Examples E1 to E19, can all achieve at the same time a difference rate of dissipation factor of less than or equal to 134%, a copper foil peeling strength of greater than or equal to 3.0 lb/in, and a comparative tracking index of greater than or equal to 500V.

Overall, the resin composition of the present disclosure can achieve at the same time a difference of glass transition temperature of less than or equal to 10° C., a difference rate of dissipation factor of less than or equal to 134%, a copper foil peeling strength of greater than or equal to 3.0 lb/in and a comparative tracking index of greater than or equal to 500V.

The above detailed description is merely illustrative in nature and is not intended to limit the embodiments of the subject matter or the application and use of such embodiments. As used herein, the term "exemplary" means "serving as an example, instance, or illustration." Any implementation described herein as exemplary is not necessarily to be construed as preferred or advantageous over other implementations.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and foreseeable equivalents at the time of filing this patent application.

What is claimed is:

1. A resin composition, comprising:
   (A) 100 parts by weight of a vinyl-containing polyphenylene ether resin;
   (B) 2 parts by weight to 50 parts by weight of any compound having a structure of Formula (1) or a combination thereof; and

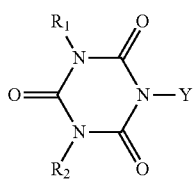

Formula (1)

(C) 20 parts by weight to 80 parts by weight of a polyolefin resin, which comprises styrene-butadiene-divinylbenzene terpolymer, styrene-butadiene-maleic anhydride terpolymer, styrene-butadiene copolymer, hydrogenated styrene-butadiene copolymer, polybutadiene, maleic anhydride-butadiene copolymer or a combination thereof;
wherein, in Formula (1),
Y is

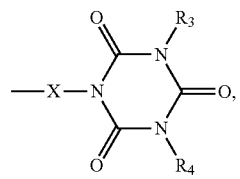

and X comprises X1, X2, X3, X4 or X5, wherein X1 to X5 are shown below:

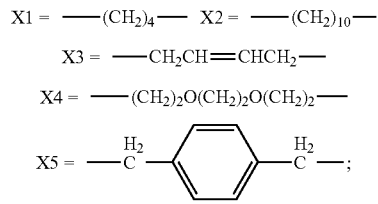

$R_1$ to $R_4$ are each an allyl group.

2. The resin composition of claim 1, wherein the vinyl-containing polyphenylene ether resin comprises a vinylbenzyl-containing biphenyl polyphenylene ether resin, a methacrylate-containing polyphenylene ether resin, a vinylbenzyl-containing bisphenol A polyphenylene ether resin, a chain-extended vinyl-containing polyphenylene ether resin or a combination thereof.

3. The resin composition of claim 1, characterized by not comprising an ethylene-propylene-diene terpolymer.

4. The resin composition of claim 1, further comprising a maleimide resin, a bis(vinylphenyl) compound, an acrylate compound or a combination thereof.

5. The resin composition of claim 1, further comprising flame retardant, inorganic filler, curing accelerator, polymerization inhibitor, solvent, silane coupling agent, coloring agent, toughening agent, core-shell rubber or a combination thereof.

6. An article made from the resin composition of claim 1, comprising a prepreg, a resin film, a laminate or a printed circuit board.

7. The article of claim 6, having a difference of glass transition temperature calculated according to a glass transition temperature as measured by reference to IPC-TM-650 2.4.24.4 of less than or equal to 10° C.

8. The article of claim 6, having a difference rate of dissipation factor calculated according to a dissipation factor as measured by reference to JIS C2565 at 10 GHz of less than or equal to 134%.

9. The article of claim 6, having a comparative tracking index as measured by reference to ASTM D3638 of greater than or equal to 500V.

10. The article of claim 6, having a copper foil peeling strength as measured by reference to IPC-TM-650 2.4.8 of greater than or equal to 3.0 lb/in.

* * * * *